J. HAWORTH.
CAMERA-STAND.
No. 176,133. Patented April 18, 1876.
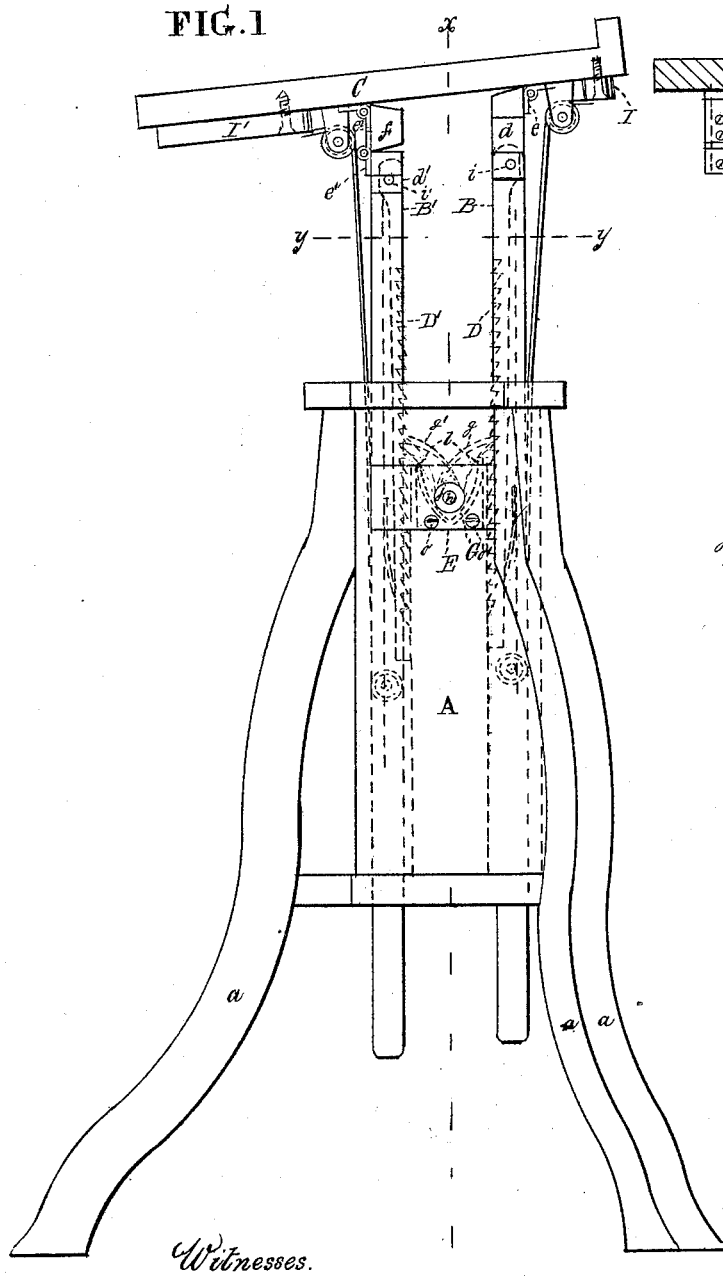
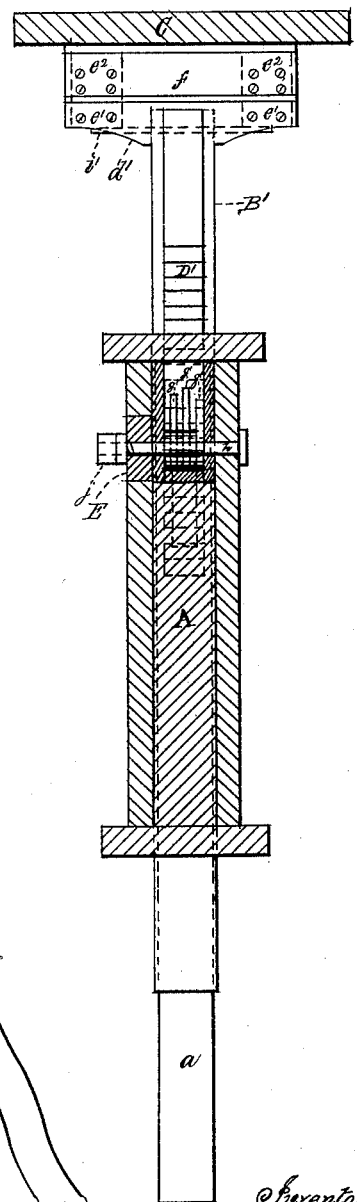

2 Sheets—Sheet 2.
J. HAWORTH.
CAMERA-STAND.
No. 176,133. Patented April 18, 1876.
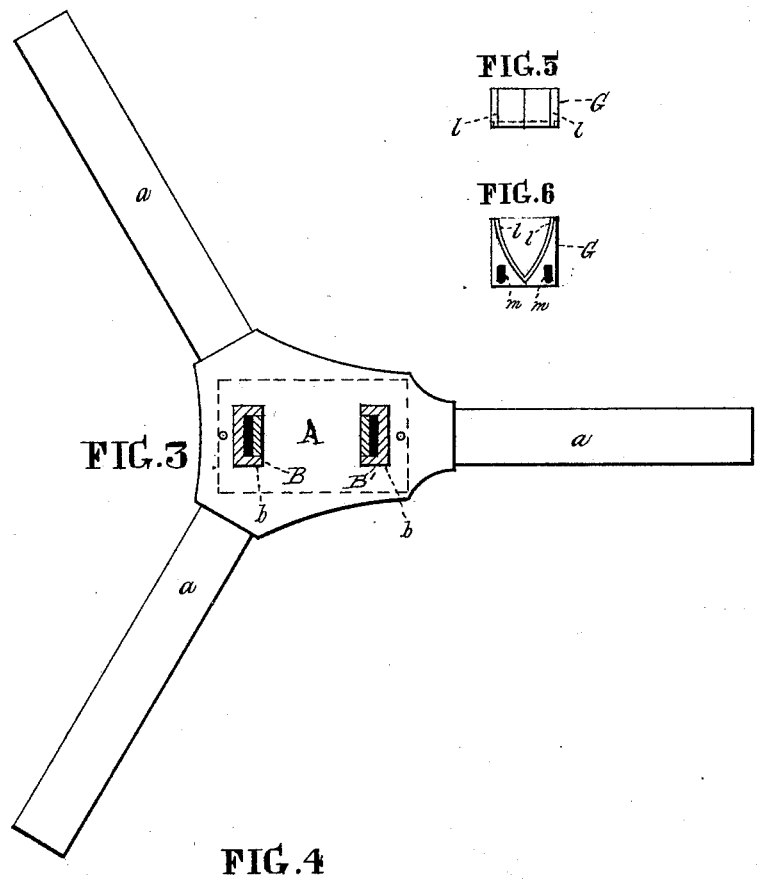
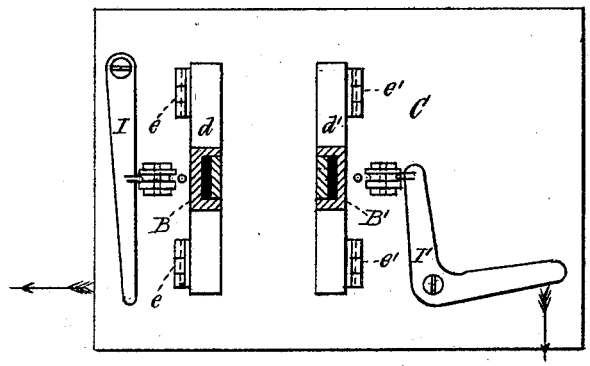
Witnesses
Thomas J. Bewley.
George C. Hetzel.
Inventor
John Haworth
Stephen Ustick Attorney

UNITED STATES PATENT OFFICE.

JOHN HAWORTH, OF PHILADELPHIA, PENNSYLVANIA.

IMPROVEMENT IN CAMERA-STANDS.

Specification forming part of Letters Patent No. 176,133, dated April 18, 1876; application filed March 2, 1876.

*To all whom it may concern:*

Be it known that I, JOHN HAWORTH, of the city and county of Philadelphia, in the State of Pennsylvania, have invented a new and useful Improvement in Camera-Stands, which improvement is fully set forth in the following specification, reference being had to the accompanying drawings.

My invention consists in the combination of two vertical slides having toothed racks, with the stationary part of the stand having pawls which engage with said rack, and with the table of the stand, to which it is hinged, in such a manner as to admit of the table being adjusted to any height required, and at any desired angle, and automatically held in its adjusted position, as hereinafter fully described.

In the accompanying drawings, Figure 1 is a side elevation of my improved camera-stand. Fig. 2 is a vertical section at the line $x\, x$, of Fig. 1. Fig. 3, Sheet No. 2, is a cross-section at the line $y\, y$, of Fig. 1, looking downward. Fig. 4 is a cross-section at the same line looking upward upon the under side of the table C, and parts attached. Fig. 5 is a front view of the casting G. Fig. 6 is a top view of the same.

Like letters of reference in all the figures indicate the same parts.

A is a vertical block, having legs $a\, a\, a$ and vertical openings. B and B' are vertical bars which pass through the openings, and are hinged at their upper ends to the adjustable table C, the bar B having a head, $d$, connected to the table by means of hinges $e\, e$. The other bar B' has a head, $d'$, which is connected to the intermediate strip $f$ by means of hinges $e^1\, e^1$, and is hinged to the table C by means of hinges $e^2\, e^2$, so as to give freedom of adjustment to the table at any desired angle for the adjustment of the camera-box.

For holding the bars B and B' in their adjusted position there are pawls $g$ on the pin $h$, which fall into the teeth of the rack D, which is hinged at its upper end to the bar B by means of the pivot $i$. Another rack, D', is pivoted to the bar B' by means of the pivot $i'$, with which are engaged pawls $g'$, the pawls of each set being of different lengths for the more accurate adjustment of the bars B and B' to give certainty to the engagement of at least one of them in any position to which the bars are brought in the adjustment of the table C. E is a block, which is let into one side of the block A far enough to come flat against one edge of the bars B and B', and through it the pin $h$ (which holds the pawls) passes, having a nut, $j$, which is adjusted to bear the block against the edges of the bars merely tight enough to hold them steady in the openings $b$. The bars B and B' have grooves $k$ in their inner sides, which receive the racks D and D'. In the grooves are confined springs F F, which bear the racks toward the middle of the block to admit of the engagement of the pawls $g\, g'$. G is a casting, seen in detail in Figs. 5 and 6, the upper edges $l\, l$ of which serve as stops for the pawls $g'\, g'$. The casting is adjustable by means of the slots $m\, m$ in the flanges $n\, n$ and confining-screws $o\, o$.

To admit of the free downward movement of the bars B and B' for lowering the table C the racks are drawn backward from their connection with the pawls by means of the cords $p\, p$, which are fastened to the lower ends of the racks at one end and pass around the pulleys H H in mortises of the bars B and B', whence they pass up to the table C and around the pulleys H H and connect with the straight lever I and bell-crank lever I', which are borne in the direction of the arrows for pulling the racks backward to disengage them from the pawls $g$ and $g'$.

The lever I' is made of bell-crank form, as represented, for the purpose of admitting its operation from the front of the stand alternately with the lever I during the downward movement of the table.

Instead of the racks D D' being hinged to the upper ends of the bars B and B' they may be hinged to their lower ends.

I claim as my invention—

1. The vertical bars B and B', having hinged racks D and D' in combination with the adjustable table C, to which they are hinged, and the block A, having pawls $g$ and $g'$, substantially in the manner and for the purpose set forth.

2. The combination of the levers I and I', having cords $b$, with the table C, racks D and D', and bars B and B', substantially as and for the purpose set forth.

3. The combination of the casting G, with the block A, and pawls $g$ $g'$ for the stoppage of the latter, substantially as set forth.

JOHN HAWORTH.

Witnesses:
  THOMAS J. BEWLEY,
  PETER V. WEAVER.